United States Patent
Kawashima

(10) Patent No.: US 8,258,247 B2
(45) Date of Patent: Sep. 4, 2012

(54) CATALYST COMPONENT FOR POLYMERIZATION OF ETHYLENE AND PROCESS FOR PRODUCING ETHYLENE POLYMER (2)

(75) Inventor: Yasutoyo Kawashima, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 140 days.

(21) Appl. No.: 12/865,617

(22) PCT Filed: Feb. 17, 2009

(86) PCT No.: PCT/JP2009/053128
§ 371 (c)(1),
(2), (4) Date: Jul. 30, 2010

(87) PCT Pub. No.: WO2009/104783
PCT Pub. Date: Aug. 27, 2009

(65) Prior Publication Data
US 2011/0003950 A1    Jan. 6, 2011

(30) Foreign Application Priority Data
Feb. 20, 2008  (JP) .................. 2008-038496

(51) Int. Cl.
C08F 4/642 (2006.01)
C08F 4/6592 (2006.01)
C08F 110/02 (2006.01)
B01J 31/22 (2006.01)

(52) U.S. Cl. ........ 526/135; 526/129; 526/133; 526/160; 526/165; 526/352; 526/943; 502/103; 502/120; 502/123; 502/126; 502/128; 502/132; 502/152

(58) Field of Classification Search .................. 502/103, 502/120, 123, 126, 128, 132, 152; 526/129, 526/133, 135, 160, 165, 352, 943
See application file for complete search history.

(56) References Cited

U.S. PATENT DOCUMENTS

| | | | |
|---|---|---|---|
| 5,585,448 A | 12/1996 | Resconi et al. | |
| 5,594,080 A | 1/1997 | Waymouth et al. | |
| 2005/0245701 A1 | 11/2005 | Oshima et al. | |

FOREIGN PATENT DOCUMENTS

| | | |
|---|---|---|
| JP | 3-74415 A | 3/1991 |
| JP | 7-165813 A | 6/1995 |
| JP | 8-34819 A | 2/1996 |
| JP | 9-510745 A | 10/1997 |
| JP | 2005-126627 A | 5/2005 |
| JP | 2005-336446 A | 12/2005 |

OTHER PUBLICATIONS

International Search Report for PCT/JP2009/053127 mailed Apr. 28, 2009.
International Search Search Report for PCT/JP2009/053130 mailed May 19, 2010.
Jongsomjit et al., "Supporting Effects of Silica-Supported Methylaluminoxane (MAO) with Zirconocene Catalyst on Ethylene/1-Olefin Copolymerization Behaviors for Linear Low-Density Polyethylene (LLDPE) Production", Ind. Eng. Chem. Res., (2004) vol. 43, No. 24, pp. 7959-7963.
Viera Marques et al., "Copolymerization of ethylene and 1-octene by homogeneous and different supported metallocenic catalysts", Journal of Applied Polymer Science, (2001) vol. 82. No. 3., pp. 724-730.
International Search Report for PCT/JP2009/053128 mailed Apr. 7, 2009.
Izzo et al., "Branched Polyethylene by Ethylene Homopolymerization with meso-Zirconocene Catalyst", Macromolecules, 1999, vol. 32, No. 21, pp. 6913-6916.
Melillo et al., "meso-Me2Si(1-indenyl)2ZrCl2/methylalumoxane catalyzed polymerization of the ethylene to ethyl-branched polyethylene", Journal of Molecular Catalysis A: Chemical, vol. 230, 2005, pp. 29-33.
US Office Action for U.S. Appl. No. 12/865,572 dated Feb. 17, 2012.
US Office Action for U.S. Appl. No. 12/865,631 dated Sep. 30, 2011.

Primary Examiner — Caixia Lu
(74) Attorney, Agent, or Firm — Birch, Stewart, Kolasch & Birch, LLP

(57) ABSTRACT

The object is to provide a catalyst component for ethylene polymerization which can produce an ethylene polymer of high molecular weight which has substantially only an ethyl branch, and a process for producing the catalyst component for ethylene polymerization which can produce an ethylene polymer of high molecular weight which has substantially only an ethyl branch. A catalyst component for polymerization of ethylene obtained by contacting the following components (A), (B), (C) and (D): component (A): a meso-metallocene compound, component (B): a compound which ionizes a metallocene compound to form an ionic complex, component (C): an organoaluminum compound, and component (D): an electron donating compound, and a process for producing the ethylene polymer by polymerizing ethylene in the presence of the above catalyst component for ethylene polymerization.

2 Claims, No Drawings

CATALYST COMPONENT FOR POLYMERIZATION OF ETHYLENE AND PROCESS FOR PRODUCING ETHYLENE POLYMER (2)

TECHNICAL FIELD

The present invention relates to a catalyst component for polymerization of ethylene and a process for producing ethylene polymer.

BACKGROUND ART

High-pressure radical process has been known for long as a process for producing polyethylene having branch structure by polymerization of ethylene. According to this process, a low-density polyethylene having complicated branch structure including short-chain branches and long-chain branches is obtained by homopolymerization of ethylene. However, since the high-pressure radical process utilizes a radical reaction, the branching structure of the resulting ethylene polymer can hardly be controlled, and mechanical strength of the ethylene polymer is not necessarily satisfactory. On the other hand, ethylene-α-olefin copolymers obtained by copolymerization of ethylene and α-olefin using an olefin polymerization catalyst comprising a transition metal, such as Ziegler-Natta catalyst or metallocene catalyst, have a short-chain branching structure of a fixed length originating from α-olefin, and hence are excellent in mechanical strength. In this case, however, α-olefin which is more expensive than ethylene must be used as a starting material.

On the other hand, recently, it has been proposed that a branched polyethylene having only ethyl branch which is a short-branch and is competitive in cost is obtained by polymerization of ethylene using a homogeneous transition metal catalyst comprising a meso-metallocene compound and methylalumoxane (Non-Patent Documents 1 and 2).

[Non-Patent Document 1] Lorella Izzo, Lucia Caporaso, Gerardo Senatore, Leone Oliva, "Branched Polyethylene by Ethylene Homopolymerization with meso-Zirconocene Catalyst", Macromolecules, U.S.A, American Chemical Society, 1999, Vol. 32, No. 21, p. 6913-6916.

[Non-Patent Document 2] Gianluca Melillo, Lorella Izzo, Roberto Centore, Angela Tuzi, Alexander Z. Voskoboynikov, Leone Oliva, "meso-Me2Si(1-indenyl)2ZrC12/methylalumoxane catalyzed polymerization of the ethylene to ethyl-branched polyethylene", Journal of Molecular Catalysis A: Chemical), Holland, ELSEVIER, 2005, Vol. 230, p. 29-33.

SUMMARY OF THE INVENTION

Problem to be Solved by the Invention

However, when ethylene is homopolymerized using a homogeneous transition metal catalyst comprising a meso-metallocene compound and methylalumoxane as mentioned above, the resulting polymer is not necessarily satisfactory with respect to molecular weight.

Under the circumstances, the problem to be solved by the present invention is to provide a catalyst component for polymerization of ethylene which can produce an ethylene polymer of high molecular weight which has substantially only an ethyl branch, and a process for producing an ethylene polymer of high molecular weight which has substantially only an ethyl branch.

Means for Solving the Problem

That is, the first aspect of the present invention relates to a catalyst component for polymerization of ethylene which is obtained by contacting the following components (A), (B), (C) and (D):
component (A): a meso-metallocene compound,
component (B): a compound which ionizes a metallocene compound to form an ionic complex,
component (C): an organoaluminum compound, and
component (D): an electron donating compound.

The second aspect of the present invention relates to a process for producing an ethylene polymer by polymerizing ethylene in the presence of the above catalyst component for polymerization of ethylene.

Advantages of the Invention

By using the catalyst component for polymerization of ethylene of the present invention, an ethylene homopolymer of high molecular weight which has substantially only an ethyl branch can be produced. Furthermore, according to the process for producing an ethylene polymer of the present invention, an ethylene polymer of high molecular weight which has substantially only an ethyl branch can be produced.

EMBODIMENTS FOR THE INVENTION

The catalyst component for polymerization of ethylene of the present invention is a catalyst component for polymerization of ethylene which is obtained by contacting the following components (A), (B), (C) and (D).

Component (A): a meso-metallocene compound.
Component (B): a compound which ionizes a metallocene compound to form an ionic complex.
Component (C): an organoaluminum compound.
Component (D): an electron donating compound.

The meso-metallocene compound of the component (A) is a transition metal compound which has a meso-cyclopentadienyl type anion skeleton and is represented by the following formula (1).

$$L_2MX_2 \qquad (1)$$

M is a transition metal atom of Group 4 in the periodic table. L is a group having a cyclopentadiene type anion skeleton, and two Ls are linked with each other through a crosslinking group containing one or two or more of carbon atom, silicon atom and germanium atom and are coordinated in meso form. X is a halogen atom, a hydrocarbon group (excluding group having cyclopentadiene type anion skeleton) or a hydrocarbonoxy group.

M in the formula (1) is a transition metal atom of Group 4 in the periodic table (IUPAC 1989), and is preferably titanium atom, zirconium atom or hafnium atom, and more preferably zirconium atom.

L in the formula (1) is a group having a cyclopentadiene type anion skeleton, and two Ls may be the same or different. Moreover, two Ls are linked with each other through a crosslinking group containing carbon atom, silicon atom and/or germanium atom and are coordinated in meso form.

The group having a cyclopentadiene type anion skeleton in L is a $\eta^5$-(substituted) indenyl group, and specific examples thereof are $\eta^5$-indenyl group, $\eta^5$-4,5,6,7-tetrahydroindenyl group, $\eta^5$-2-methylindenyl group, $\eta^5$-3-methylindenyl group, $\eta^5$-4-methylindenyl group, $\eta^5$-5-methylindenyl group, $\eta^5$-6-methylindenyl group, $\eta^5$-7-methylindenyl group, $\eta^5$-2-tert-butylindenyl group, $\eta^5$-3-tert-butylindenyl group, η⁵-4-tert-butylindenyl group, η⁵-5-tert-butylindenyl group, η⁵-6-tert-butylindenyl group, η⁵-7-tert-butylindenyl group, η⁵-2,3-dimethylindenyl group, η⁵-2,4,7-trimethylindenyl group, η⁵-2-methyl-4-isopropylindenyl group, η⁵-4,5-benzindenyl group, η⁵-4-phenylindenyl group, methyl-5-4-phenylindenyl group, η⁵-2-methyl-4-phenylindenyl group, η⁵-2-methyl-4-naphthylindenyl group, η⁵-3-benzylindenyl group, and these groups having substituent. In this specification, "η⁵" in the names of transition metal compounds is sometimes omitted.

The groups having a cyclopentadiene type anion skeleton are linked with each other through a crosslinking group containing one or two or more of carbon atoms, silicon atoms and germanium atoms. These crosslinking groups include, for example, alkylene groups such as ethylene group and propylene group; substituted alkylene groups such as dimethylmethylene group and diphenylmethylene group; substituted silylene groups such as silylene group, dimethylsilylene group, diphenylsilylene group and tetramethyldisilylene group; and germylene groups such as dimethylgermylene group and diphenylgermylene group.

The meso-metallocene compound of the component (A) is preferably a transition metal compound having a meso-indene type anion skeleton and is represented by the following formula (2).

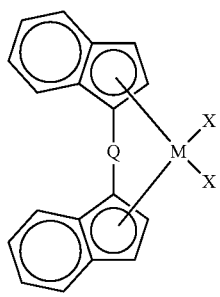

(2)

[in the formula, M is a transition metal atom of Group 4 in the periodic table, X is a halogen atom, a hydrocarbon group (excluding group having cyclopentadiene type anion skeleton) or a hydrocarbonoxy group, and the indenyl skeletons are linked through a crosslinking group Q represented by the following formula (3) and are coordinated in meso form. A plurality of X may be the same or different.

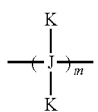

(3)

(in the formula, m is an integer of 1-5, J represents an atom of Group 14 in the periodic table, K is a hydrogen atom, a halogen atom, a hydrocarbon group (excluding group having cyclopentadiene type anion skeleton), a hydrocarbon group substituted with a substituted silyl group or a hydrocarbon group substituted with a substituted amino group, and a plurality of J may be the same or different. A plurality of K may be the same or different)].

In the formula (3), J is an atom of Group 14 in the periodic table (IUPAC 1989) and is carbon atom, silicon atom or germanium atom. J is more preferably carbon atom or silicon atom. A plurality of J may be the same or different.

X in the formula (1) and (2) is a halogen atom, a hydrocarbon group (excluding the group having cyclopentadiene type anion skeleton) or a hydrocarbonoxy group. Specific examples of the halogen atom are fluorine atom, chlorine atom, bromine atom and iodine atom. The hydrocarbon group here does not include the group having cyclopentadiene type anion skeleton. Examples of the hydrocarbon group are alkyl groups, aralkyl groups, aryl groups, alkenyl groups, etc. Examples of the hydrocarbonoxy group are alkoxy groups, aralkyloxy groups, aryloxy groups, etc. A plurality of X may be the same or different.

K in the formula (3) is a hydrogen atom, a halogen atom, a hydrocarbon group (excluding group having cyclopentadiene type anion skeleton), a hydrocarbonoxy group, a hydrocarbon group substituted with a substituted silyl group or a hydrocarbon group substituted with a substituted amino group. Examples of the halogen atom are fluorine atom, chlorine atom, bromine atom and iodine atom. The hydrocarbon group here does not include group having cyclopentadiene type anion skeleton. Examples of the hydrocarbon group here are alkyl groups, aralkyl groups, aryl groups, alkenyl groups, etc., and examples of the hydrocarbonoxy group are alkoxy groups, aralkyloxy groups, aryloxy groups, etc. A plurality of K may be the same or different.

The alkyl groups in X and K include, for example, methyl group, ethyl group, n-propyl group, isopropyl group, n-butyl group, sec-butyl group, tert-butyl group, isobutyl group, n-pentyl group, neopentyl group, amyl group, n-hexyl group, n-octyl group, n-decyl group, n-dodecyl group, n-pentadecyl group, n-eicosyl group, etc. These alkyl groups may be substituted with a halogen atom such as fluorine atom, chlorine atom, bromine atom, or iodine atom. Examples of the alkyl groups substituted with halogen atom are fluoromethyl group, trifluoromethyl group, chloromethyl group, trichloromethyl group, fluoroethyl group, pentafluoroethyl group, perfluoropropyl group, perfluorobutyl group, perfluorohexyl group, perfluorooctyl group, perchloropropyl group, perchlorobutyl group, perbromopropyl group, etc. Furthermore, these alkyl groups may be partially substituted with an alkoxy group such as methoxy group or ethoxy group; an aryloxy group such as phenoxy group; an aralkyloxy group such as benzyloxy group; or the like.

The aralkyl groups in X and K include, for example, benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl) methyl group, (3,4-dimethylphenyl)methyl group, (3,5-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl) methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl) methyl group, (tert-butylphenyl) methyl group, (n-pentylphenyl)methyl group, (neopentylphenyl)methyl group, (n-hexylphenyl)methyl group, (n-octylphenyl)methyl group, (n-decylphenyl) methyl group, (n-dodecylphenyl)methyl group, naphthylmethyl group, and anthracenylmethyl group, and these aralkyl groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The aryl groups in X and K include, for example, phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylhenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, and anthracenyl group, and these aryl groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The alkenyl groups in X and K include, for example, allyl group, methallyl group, crotyl group and 1,3-diphenyl-2-propenyl group.

The alkoxy groups in X and K include, for example, methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodesoxy group, n-pentadesoxy group, and n-icosoxy group, and these alkoxy groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The aralkyloxy groups in X and K include, for example, benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylhenyl)methoxy group, (n-butylphenyl)methoxy group, (sec-butylphenyl)methoxy group, (tert-butylphenyl) methoxy group, (n-hexylphenyl)methoxy group, (n-octylphenyl)methoxy group, (n-decylphenyl)methoxy group, naphthylmethoxy group, and anthracenylmethoxy group, and these aralkyloxy groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The aryloxy groups in X and K include, for example, phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2-tert-butyl-3-methylphenoxy group, 2-tert-butyl-4-methylphenoxy group, 2-tert-butyl-5-methylphenoxy group, 2-tert-butyl-6-methylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 2-tert-butyl-3,4-dimethylphenoxy group, 2-tert-butyl-3,5-dimethylphenoxy group, 2-tert-butyl-3,6-dimethylphenoxy group, 2,6-di-tert-butyl-3-methylphenoxy group, 2-tert-butyl-4,5-dimethylphenoxy group, 2,6-di-tert-butyl-4-methylphenoxy group, 3,4,5-trimethylphenoxy group, 2,3,4,5-tetramethylphenoxy group, 2-tert-butyl-3,4,5-trimethylphenoxy group, 2,3,4,6-tetramethylphenoxy group, 2-tert-butyl-3,4,6-trimethylphenoxy group, 2,6-di-tert-butyl-3,4-dimethylphenoxy group, 2,3,5,6-tetramethylphenoxy group, 2-tert-butyl-3,5,6-trimethylphenoxy group, 2,6-di-tert-butyl-3,5-dimethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, and anthracenoxy group, and these aryloxy groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The hydrocarbon groups substituted with a substituted silyl group in K include, for example, trimethylsilylmethyl group, trimethylsilylethyl group, trimethylsilylpropyl group, trimethylsilylbutyl group, trimethylsilylphenyl group, bis(trimethylsilyl)methyl group, bis(trimethylsilyl)ethyl group, bis(trimethylsilyl)propyl group, bis(trimethylsilyl)butyl group, bis(trimethylsilyl)phenyl group, and triphenylsilylmethyl group.

The hydrocarbon groups substituted with a substituted amino group in K include, for example, dimethylaminomethyl group, dimethylaminoethyl group, dimethylaminopropyl group, dimethylaminobutyl group, dimethylaminophenyl group, bis(dimethylamino)methyl group, bis(dimethylamino)ethyl group, bis(dimethylamino)propyl group, bis(dimethylamino)butyl group, bis(dimethylamino)phenyl group, phenylaminomethyl group, diphenylaminomethyl group, and diphenylaminophenyl group.

Examples of the crosslinking group Q include, for example, alkylene groups such as ethylene group and propylene group; substituted alkylene groups such as dimethylmethylene group and diphenylmethylene group; substituted silylene groups such as silylene group, dimethylsilylene group, diphenylsilylene group and tetramethyldisilylene group; and germylene groups such as dimethylgermylene group and diphenylgermylene group.

As the specific examples of meso-metallocene compounds containing a group having a structure of two cyclopentadienyl type anion skeletons being bonded through a crosslinking group, mention may be made of titanium compounds such as meso-dimethylsilylenebis(indenyl)titanium dichloride, meso-dimethylsilylenebis(2-methylindenyl)titanium dichloride, meso-dimethylsilylenebis(2-tert-butylindenyl)titanium dichloride, meso-dimethylsilylenebis(2,3-dimethylindenyl) titanium dichloride, meso-dimethylsilylenebis(2,4,7-trimethylindenyl)titanium dichloride, mesa-dimethylsilylenebis (2-methyl-4-isopropylindenyl)titanium dichloride, mesa-dimethylsilylenebis(4,5-benzindenyl)titanium dichloride, meso-dimethylsilylenebis(2-phenylindenyl)titanium dichloride, meso-dimethylsilylenebis(4-phenylindenyl)titanium dichloride, meso-dimethylsilylenebis(2-methyl-4-phenylindenyl)titanium dichloride, mesa-dimethylsilylenebis(2-methyl-5-phenylindenyl)titanium dichloride, meso-dimethylsilylenebis(2-methyl-4-naphthylindenyl)titanium dichloride, mesa-dimethylsilylenebis(3-benzylindenyl)titanium dichloride, meso-dimethylsilylene(indenyl)(3-benzylindenyl)titanium dichloride, mesa-dimethylsilylenebis(4,5,6,7-tetrahydroindenyl)titanium dichloride, etc; zirconium compounds such as meso-dimethylsilylenebis(indenyl)zirconium dichloride, meso-dimethylsilylenebis(2-methylindenyl)zirconium dichloride, meso-dimethylsilylenebis(2-tert-butylindenyl) zirconium dichloride, mesa-dimethylsilylenebis(2,3-dimethylindenyl)zirconium dichloride, meso-dimethylsilylenebis(2,4,7-trimethylindenyl)zirconium dichloride, meso-dimethylsilylenebis(2-methyl-4-isopropylindenyl) zirconium dichloride, meso-dimethylsilylenebis(4,5-benzindenyl)zirconium dichloride, meso-dimethylsilylenebis(2-phenylindenyl)zirconium dichloride, meso-dimethylsilylenebis(4-phenylindenyl)zirconium dichloride, meso-dimethylsilylenebis(2-methyl-4-phenylindenyl)zirconium dichloride, meso-dimethylsilylenebis(2-methyl-5-phenylindenyl)zirconium dichloride, meso-dimethylsilylenebis(2-methyl-4-naphthylindenyl) zirconium dichloride, meso-dimethylsilylenebis(3-benzylindenyl)zirconium dichloride, meso-dimethylsilylene(indenyl)(3-benzylindenyl) zirconium dichloride, meso-dimethylsilylenebis (4,5,6,7-tetrahydroindenyl)zirconium dichloride, etc.; and hafnium compounds such as meso-dimethylsilylenebis(indenyl)hafnium dichloride, meso-dimethylsilylenebis(2-methylindenyl)hafnium dichloride, meso-dimethylsilylenebis(2-tert-butylindenyl)hafnium dichloride, meso-dimethylsilylenebis(2,3-dimethylindenyl)hafnium dichloride, meso-dimethylsilylenebis(2,4,7-trimethylindenyl)hafnium dichloride, meso-dimethylsilylenebis(2-methyl-4-isopropylindenyl) hafnium dichloride, meso-dimethylsilylenebis(4,5-benzindenyl)hafnium dichloride, meso-dimethylsilylenebis(2-phenylindenyl)hafnium dichloride, meso-dimethylsilylenebis(4-phenylindenyl)hafnium dichloride, meso-dimethylsilylenebis(2-methyl-4-phenylindenyl) hafnium dichloride, meso-dimethylsilylenebis(2-methyl-5-phenylindenyl)hafnium dichloride, mesa-dimethylsilylenebis(2-methyl-4-naphthylindenyl)hafnium dichloride, meso-dimethylsilylenebis(3-benzylindenyl) hafnium dichloride, mesa-dimethylsilylene(indenyl)(3-benzylindenyl)hafnium dichloride, meso-dimethylsilylenebis(4,5,6,7-tetrahydroindenyl)hafnium dichloride, etc. In the above compounds, dimethylsilylene may be changed to methylene, ethylene, dimethylmethylene(isopropylidene), diphenylmethylene, diethylsilylene, diphenylsilylene, dimethoxysilylene, dimethylgermylene or diphenylgermylene, and dichloride may be changed to difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide).

The meso-metallocene compounds of the component (A) are preferably those which contain a group having a structure where two cyclopentadienyl type anion skeletons are bonded through a crosslinking group such as alkylene group or silylene group.

The cyclopentadienyl type anion skeletons are preferably indenyl group, methylindenyl group, and benzylindenyl group, and indenyl group is more preferred, and the crosslinking groups are preferably ethylene group, dimethylmethylene group, and dimethylsilylene group, and dimethylsilylene group is more preferred. More preferred meso-metallocene compounds are meso-ethylenebis(1-indenyl)zirconium dichloride and meso-dimethylsilylenebis(1-indenyl)zirconium dichloride, and as further preferred meso-metallocene compounds, mention may be made of meso-dimethylsilylenebis(1-indenyl)zirconium dichloride.

These transition metal compounds may be used each alone or in combination of two or more.

The component (B) is a compound which ionizes a metallocene compound to form an ionic complex.

Examples of the compound which ionizes a metallocene compound to form an ionic complex are organoaluminumoxy compounds and/or boron compounds.

The organoaluminum oxy compounds include cyclic aluminoxanes having a structure represented by the following formula (4), linear aluminoxanes having a structure represented by the following formula (5), modified aluminoxane compounds obtained by reacting the compound of the formula (4) and/or (5) with a compound having hydroxyl group, and the like. (In the formulas, $R^1$ and $R^2$ are hydrocarbon groups, and all $R^1$s and all $R^2$s may be the same or different, a denotes an integer of 2 or more, and b denotes an integer of 1 or more.) The hydrocarbon groups of $R^1$ and $R^2$ are preferably hydrocarbon groups of 1-8 carbon atoms and more preferably alkyl groups.

$$[-Al(R^1)-O-]_a \qquad (4)$$

$$R^2[-Al(R^2)-O-]_b AlR^2_2 \qquad (5)$$

Specific examples of $R^1$ and $R^2$ in the cyclic aluminoxanes having a structure represented by the formula (4) and the linear aluminoxanes having a structure represented by the formula (5) are alkyl groups such as methyl group, ethyl group, n-propyl group, isopropyl group, n-butyl group, isobutyl group, n-pentyl group, and neopentyl group. The suffix a is an integer of 2 or more and suffix b is an integer of 1 or more. Preferably, R' and $R^2$ are methyl group or isobutyl group, and a is 2-40, and b is 1-40.

The above aluminoxane is produced by various processes. The processes are not particularly limited, and it is produced in accordance with known processes. For example, it is produced by contacting with water a solution prepared by dissolving a trialkylaluminum (e.g., trimethylaluminum) in a suitable organic solvent (such as benzene or aliphatic hydrocarbon). Furthermore, there may be used a process of contacting a trialkylaluminum (e.g., trimethylaluminum) and a metal salt containing water of crystallization (e.g., copper sulfate hydrate). The aluminoxane obtained in this way or a commercially available aluminoxane is considered to be usually a mixture of aluminoxanes of the formulas (4) and (5).

It is also preferred to use modified aluminoxane compound formed by reacting the above aluminoxanes (aluminoxanes of the formulas (4) and/or (5)) with a compound having hydroxyl group. The compounds having hydroxyl group include alcohol, phenol or silanol.

Specific examples of the organoaluminumoxy compounds are methylaluminoxane, methylisobutylaluminoxane, etc.

The boron compounds include, for example, tris(pentafluorophenyl)borane, triphenylcarbeniumtetrakis(pentafluorophenyl) borate, tri(n-butyl)ammoniumtetrakis(pentafluorophenyl) borate, and N,N-dimethylaniliniumtetrakis(pentafluorophenyl) borate.

The compound which ionizes a metallocene compound to form an ionic complex is preferably an organoaluminumoxy.

The component (B) may be supported on a particulate carrier. The particulate carrier is preferably a porous material, and there may be used inorganic oxides such as $SiO_2$, $Al_2O_3$, $MgO$, $ZrO_2$, $TiO_2$, $B_2O_3$, $CaO$, $ZnO$, $BaO$ and $ThO_2$; clays or clay minerals such as smectite, montmorillonite, hectorite, laponite and saponite; and organic polymers such as polyethylene, polypropylene and styrene-divinylbenzene copolymer.

The 50% volume average particle diameter of the articulate carrier is usually 10-500 μm, and the 50% volume average particle diameter is measured by a light scattering type laser diffraction method and the like. Furthermore, the pore volume of the particulate carrier is usually 0.3-10 ml/g, and the specific surface area is usually 10-1000 m²/g. The pore volume and specific surface area are measured by gas adsorption method, and the pore volume is obtained by analyzing the gas desorption amount according to BJH method, and the specific surface area is obtained by analyzing the gas absorption amount according to BET method.

The particulate carrier is preferably dried to substantially remove water, and is preferably dried by heating. With reference to the particulate carrier in which water cannot be recognized by visual observation, the drying temperature is usually from 100 to 1500° C., preferably from 100 to 1000° C., more preferably from 200 to 800° C. The heating time is not particularly limited, and is preferably 10 minutes-50 hours, more preferably 1-30 hours. As the method for frying by heating, there may be used a method of drying by flowing dried inert gas (e.g., nitrogen or argon) at a specific flow rate during heating or a method of carrying out heating and drying under reduced pressure.

The method of supporting the compound of the component (B) which ionizes metallocene compound to form an ionic complex may be any methods of contacting the compound which ionizes metallocene compound to form an ionic complex with the particulate carrier, and an example of the methods is to contact them by mixing in a solvent. Further, there may be employed a method of preparing the compound which ionizes metallocene compound to form an ionic complex in the presence of the particulate carrier.

The contacting treatment of the compound which ionizes metallocene compound to form an ionic complex with the particulate carrier is carried out preferably in an inert gas atmosphere. The treating temperature is usually −100° C. to +300° C., preferably −80° C. to +200° C. The heating time is usually 1 minute to 20 hours, preferably 10 minutes to 100 hours. The treatment can be carried out using a solvent or can be directly carried out without using solvent.

As the solvent used for the contact treatment, there may be used a solvent inert for the compound which ionizes metallocene compound to form an ionic complex, and hydrocarbon solvents are usually used. Examples thereof are saturated hydrocarbon solvents such as butane, pentane, hexane, heptane, octane, 2,2,4-trimethylpentane and cyclohexane; and aromatic hydrocarbon solvents such as benzene, toluene and xylene.

As the organoaluminum compound of the component (C), known organoaluminum compound may be used. Preferred is an organoaluminum compound represented by the following formula (6).

$$R^3_c AlY_{3-c} \quad (6)$$

(in the formula, R represents a hydrocarbon group, and all $R^3$s may be the same or different, Y represents hydrogen atom, a halogen atom, an alkoxy group, an aralkyloxy group or an aryloxy group, and all Ys may be the same or different, and c represents a numeral satisfying $0 < c \leq 3$).

In the formula (6) representing the organoaluminum compound, $R^3$ is preferably a hydrocarbon group of 1-24 carbon atoms, and more preferably an alkyl group of 1-24 carbon atoms. Specific examples are methyl group, ethyl group, n-propyl group, n-butyl group, isobutyl group, n-hexyl group, 2-methylhexyl group, and n-octyl group, and preferred are ethyl group, n-butyl group, isobutyl group, n-hexyl group and n-octyl group.

Examples of halogen atom of Y are fluorine atom, chlorine atom, bromine atom, and iodine atom, and chlorine atom is preferred.

The alkoxy group in Y is preferably an alkoxy group of 1-24 carbon atoms. Specific examples are methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodesoxy group, n-pentadesoxy group, and n-icosoxy group, and methoxy group, ethoxy group and tert-butoxy group are preferred.

The aryloxy group in Y is preferably an aryloxy group of 6-24 carbon atoms. Specific examples thereof are phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, and anthracenoxy group.

The aralkyloxy group in Y is preferably an aralkyloxy group of 7-24 carbon atoms. Specific examples thereof are benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,5,6-tetramethylphenyl) methoxy group, (pentamethylphenyl) methoxy group, (ethylphenyl)methoxy group, (n-propylphenyl)methoxy group, (isopropylhenyl)methoxy group, (n-butylphenyl)methoxy group, (sec-butylphenyl) methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, and anthracenylmethoxy group. Benzyloxy group is preferred.

Specific examples of the organoaluminum compounds represented by the formula (6) are trialkylaluminums such as trimethylaluminum, triethylaluminum, tri-n-propylaluminum, tri-n-butylaluminum, triisobutylaluminum, tri-n-hexylaluminum and tri-n-octylaluminum; dialkylaluminum chlorides such as dimethylaluminum chloride, diethylaluminum chloride, di-n-propylaluminum chloride, di-n-butylaluminum chloride, diisobutylaluminum chloride and di-n-hexylaluminum chloride; alkylaluminum dichlorides such as methylaluminum dichloride, ethylaluminum dichloride, n-propylaluminum dichloride, n-butylaluminum dichloride, isobutylaluminum dichloride and n-hexylaluminum dichloride; dialkylaluminum hydrides such as dimethylaluminum hydride, diethylaluminum hydride, di-n-propylaluminum hydride, di-n-butylaluminum hydride, diisobutylaluminum hydride and di-n-hexylaluminum hydride; alkyl(dialkoxy) aluminums such as methyl(dimethoxy)aluminum, methyl(diethoxy)aluminum and methyl(di-tert-butoxy)aluminum; dialkyl(alkoxy)aluminums such as dimethyl(methoxy)aluminum, dimethyl(ethoxy)aluminum and dimethyl(tert-butoxy)aluminum; alkyl(diaryloxy)aluminums such as methyl(diphenoxy)aluminum, methylbis(2,6-diisoropylphenoxy) aluminum and methylbis(2,6-diphenylphenoxy) aluminum; dialkyl(aryloxy)aluminums such as dimethyl(phenoxy)aluminum, dimethyl(2,6-diisopropylphenoxy) aluminum and dimethyl(2,6-diphenylphenoxy)aluminum.

Among them, preferred are trialkylaluminums, more preferred are trimethylaluminum, triethylaluminum, tri-butylaluminum, triisobutylaluminum, tri-n-hexylaluminum and tri-n-octylaluminum, and especially preferred are triisobutylaluminum, triethylaluminum and tri-n-octylaluminum.

These organoaluminum compounds may be used each alone or in combination of two or more.

The electron donating compound of the formula (D) is preferably a compound containing nitrogen atom, phosphorus atom, oxygen atom or sulfur atom, and mention may be made of oxygen-containing compounds, nitrogen-containing compounds, phosphorus-containing compounds and sulfur-containing compounds, and the oxygen-containing compounds and nitrogen-containing compounds are preferred.

The oxygen-containing compounds are preferably alkoxy-silicones, ethers, ketons, aldehydes, carboxylic acids, esters of organic acids or inorganic acids, acid amides of organic acids or inorganic acids, acid anhydrides, etc., and alkoxy-silicones and ethers are preferred.

The nitrogen-containing compounds are amines, nitriles, isocyanates, etc., and amines are preferred.

The alkoxysilicones are preferably alkoxysilicone compounds represented by the formula $R^4_d Si(OR^5)_{4-d}$ (in the formula, $R^4$ represents a hydrocarbon group of 1-20 carbon atoms, a hydrogen atom or a hetero-atom-containing substituent, $R^5$ represents a hydrocarbon group of 1-20 carbon atoms, and d represents a numeral satisfying $0 \leq d < 4$). All $R^{4s}$ and all $R^{5s}$ may be the same or different.

When $R^4$ and $R^5$ are hydrocarbon groups, as examples thereof, mention may be made of straight-chain alkyl groups such as methyl group, ethyl group, propyl group, butyl group and pentyl group, branched-chain alkyl groups such as isopropyl group, sec-butyl group, tert-butyl group and tert-amyl group, cycloalkyl groups such as cyclopentyl group and cyclohexyl group, cycloalkenyl groups such as cyclopentenyl group, and aryl groups such as phenyl group and tolyl group.

When $R^4$ is a hetero-atom-containing substituent, the hetero-atoms include oxygen atom, nitrogen atom, sulfur atom and phosphorus atom. Specific examples of the substituents are dimethylamino group, methylethylamino group, diethylamino group, ethyl-n-propylamino group, d-n-propylamino group, pyrrolyl group, pyridyl group, pyrrolydinyl group, piperidyl group, perhydroindolyl group, perhydroisoindolyl group, perhydroquinolyl group, perhydroisoquinolyl group, perhydrocarbazoyl group, perhydroacridinyl group, furyl group, pyranyl group, perhydrofuryl group, and thienyl group.

The alkoxysilicones are preferably those in which $R^4$ and $R^5$ are alkyl groups, and more preferably d satisfies $4 > d \geq 2$.

Specific examples of the alkoxysilicones are tetramethoxysilane, methyltrimethoxysilan, ethyltrimethoxysilane, n-propyltrimethoxysilane, isopropyltrimethoxysilane, n-butyltrimethoxysilane, isobutyltrimethoxysilane, sec-butyltrimethoxysilane, tert-butyltrimethoxysilane, n-pentyltrimethoxysilane, tert-amyltrimethoxysilane, dimethyldimethoxysilane, diethyldimethoxysilane, di-n-butyldimethoxysilane, diisobutyldimethoxysilane, di-tert-butyldimethoxysilane, methylethyldimethoysilane, methyl-n-propyldimethoxysilane, methyl-n-butyldimethoxysilane, methylisobutyldimethoxysilane, tert-butylmethyldimethoxysilane, tert-butylethyldimethoxysilane, tert-butyl-npropyldimethoxysilane, tert-butylisopropyldimethoxysilane, tert-butyl-n-butyldimethoxysilane, tert-butylisopropyldimethoxysilane, tert-butyl-n-butyldimethoxysilane, tert-butylisobutyldimethoxysilane, tert-amylmethyldimethoxysilane, tert-amylethylsimethoxysilane, tert-amyl-n-ropyldimethoxysilane, tert-amyl-n-butyldimethoxysilane, isobutylisopropyldimethoxysilane, dicyclobutyldimethoxysilane, cyclobutylmethyldimethoxysilane, cyclobutylethyldimethoxysilane, cyclobutylisopropyldimethoxysilane, cyclobutyl-n-butyldimethoxysilane, cyclobutylisobutyldimethoxysilane, cyclobutyl-tertbutyldimethoxysilane, dicyclopentyldimethoxysilane, cyclopentylmethyldimethoxysilane, cyclopentyl-n-propyldimethoxysilane, cyclopentylisopropyldimethoxysilane, cyclopentyl-n-butyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexyl-n-propyldimethoxysilane, cyclohexylisopropyldimethoxysilane, cyclohexyl-n-butyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylethyldimethoxysilane, phenyl-n-propyldimethoxysilane, phenylisopropyldimethoxysilane, phenyl-n-butyldimethoxysilane, phenylisobutyldimethoxysilane, phenyl-tert-butyldimethoxysilane, phenylcyclopentyldimethoxysilane, 2-norbornanemethyldimethoxysilane, bi(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, trimethylmethoxysilane, triethylmethoxysilane, tri-n-propylmethoxysilane, triisopropylmethoxysilane, tri-n-butylmethoxysilane, triisobutylmethoxysilane, and tri-tert-butylmethoxysilane. There may also be used above compounds in which methoxy is replaced with ethoxy, propoxy, n-butoxy, isobutoxy, tert-butoxy or phenoxy. Preferred are dialkyldialkoxysilanes or trialkylmonoalkoxysilanes, more preferred are trialkylmonoalkoxysilanes, and further preferred is trimethylmethoxysilane.

Examples of ethers are dialkyl ethers, alkylaryl ethers, diaryl ethers, diether compounds, cyclic ethers and cyclic diethers.

Specific examples are dimethyl ether, diethyl ether, di-n-propyl ether, diisopropyl ether, di-n-butyl ether, disisobutyl ether, di-tert-butyl ether, dicyclohexyl ether, diphenyl ether, methylethyl ether, mthyl-n-propyl ether, methylisopropyl ether, methyl-n-butyl ether, methylisobutyl ether, methyl-tert-butyl ether, methylcyclohexyl ether, methylphenyl ether, ethylene oxide, propylene oxide, oxetan, tetrahydrofuran, 2,5-dimethyltetrahydrofuran, tetrahydropyran, 1,2-dimethoxyethane, 1,2-diethoxyethane, 1,2-diisobutoxyethane, 2,2-dimethoxypropane, 1,3-dimethoxypropane, 2,2-diisobutyl-3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3- dimethoxypropane, 2,2-diisopropyl-1,3-dimethoxypropane, 2-isopropyl-2-cyclohexylmethyl-1,3-dimethoxypropane 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane, 1,2-dimethoxybenzene, 1,3-dimethoxybenzene, 1,4-dimethoxybenzene, 1,3-dioxolan, 1,4-dioxane, and 1,3-dioxane. Preferred are diethyl ether, di-n-butyl ether, methyl-n-butyl ether, methyl-t-butyl ether, methylphenyl ether, tetrahydrofuran, 1,3-dioxane, 1,4-dioxane and 1,3-dioxolan, and more preferred are diethyl ether, di-n-butyl ether, methyl-t-butyl ether and tetrahydrofuran.

Examples of the carboxylic acid esters are mono- and polyvalent carboxylic acid esters such as saturated aliphatic carboxylic acid esters, unsaturated aliphatic carboxylic acid esters, alicyclic carboxylic acid esters and aromatic carboxylic acid esters. Specific examples of the esters are methyl acetate, ethyl acetate, n-butyl acetate, isobutyl acetate, tert-buty acetate, phenyl acetate, methyl propionate, ethyl propionate, ethyl butyrate, ethyl valerate, ethyl acrylate, methyl methacrylate, methyl benzoate, ethyl benzoate, n-butyl benzoate, isobutyl benzoate, tert-butyl benzoate, methyl toluylate, ethyl toluylate, methyl anisate, ethyl anisate, dimethyl succinate, diethyl succinate, di-n-butyl succinate, dimethyl malonate, diethyl malonate, di-n-butyl malonate, dimethyl maleate, dibutyl maleate, diethyl itaconate, di-n-butyl itaconate, monoethyl phthalate, dimethyl phthalate, methylethyl phthalate, diethyl phthalate, di-n-propyl phthalate, diisopropyl phthalate, di-n-butyl phthalate, diisobutyl phthalate, di-tert-butyl phhalate, dipentyl phthalate, di-n-hexyl phthalate, diheptyl phthalate, di-n-octyl phthalate, di(2-ethylhexyl) phthalate, diisodecyl phthalate, dicyclohexyl phthalate, diphenyl phthalate, dimethyl isophthalate, diethyl isophthalate, di-n-butyl isophthalate, diisobutyl isophthalate, di-tert-butyl isophthalate, dimethyl terephthalate, diethyl terephthalate, di-n-butyl terephthalate, diisobutyl trephthalate, and di-tert-butyl terephthalate. Preferred are methyl acetate, ethyl acetate, methyl benzoate, ethyl benzoate, dimethyl phthalate, diethyl phthalate, di-n-butyl phthalate, diisobutylphthalate, dimethyl terephthalate and diethyl terephthalate, and more preferred are methyl benzoate, dimethyl phthalate, diethyl phthalate, diisobutyl phthalate and dimethyl terephthalate.

As examples of amines, mention may be made of trihydrocarbylamines, and trimethylamine, triethylamine, tripropylamine, tri-n-butylamine, triisobutylamine, trihexylamine, trioctylamine, tridecylamine and triphenylamine. Triethylamine and trioctylamine are preferred.

As the electron donating compounds of component (D), alkoxysilicones, ethers and amines are preferably used. These electron donating compounds may be used each alone or in combination of two or more.

The catalyst component for polymerization of ethylene of the present invention is obtained by contacting the above-mentioned component (A), component (B), component (C) and component (D). The amount of the component (A) used is usually 0.000001-0.002 mol, preferably 0.00001-0.002 mol for 1 g of the component (B). The amount of the component (C) used is usually 0.01-10000, preferably 0.1-10000 in molar ratio of component (C) to component (A) ((C)/(A)). The amount of the component (D) used is usually 0.01-2000 mmols, preferably 0.05-2000 mmols, more preferably 0.1-100 mmols for 1 g of the component (B).

The proportion of the meso-metallocene compound in metallocene compounds is usually 95% by weight or more, preferably 97% by weight or more, more preferably 99% by weight or more.

The meso-metallocene compound can be obtained by the process such as recrystallization. Further, the proportion of the meso-metallocene compound in metallocene compounds can usually be obtained by an analytical method such as NMR.

For example, analysis value of $^1$H-NMR of meso-dimethylsilylenebis(1-indenyl)zirconium dichloride which is one of meso-metallocene compounds is mentioned in Non-Patent Document 2.

In addition to ethylene, α-olefin can be copolymerized as far as the effect of the present invention is not damaged.

The α-olefins copolymerized with ethylene include, for example, olefins of from 3 to 20 carbon atoms such as propylene, 1-butene, 1-pentene, 1-hexene, 4-methyl-1-pentene and 4-methyl-1-hexene, or diolefins, cyclic olefins, alkenyl aromatic hydrocarbons, α,β-unsaturated carboxylic acids, etc. These may be used each alone or in combination of two or more.

The content of monomer units of α-olefins other than ethylene is usually 20% by weight or less, preferably 10% by weight or less, more preferably 5% by weight or less, further preferably 3% by weight or less based on total weight of polymer (100% by weight) from the viewpoint of reduction in production cost of polymer. Particularly, an ethylene homopolymer is preferred.

The method for feeding the catalyst components to a reactor for preparation of catalyst or a reactor for polymerization is also not particularly limited. There are, for example, a method of feeding each component in solid state, a method of feeding each component in the state of solution prepared by dissolving the component in a hydrocarbon solvent from which components deactivating the catalyst component such as water and oxygen are sufficiently removed, or in the state of suspension or slurry in the solvent. Examples of the solvent used in this case are aliphatic hydrocarbon solvents such as butane, pentane, hexane, heptane and octane, aromatic hydrocarbon solvents such as benzene and toluene, and halogenated hydrocarbons such as methylene chloride, and aliphatic hydrocarbon solvents and aromatic hydrocarbon solvents are preferred.

The method for polymerization of ethylene using the catalyst components for ethylene polymerization of the present invention is also not particularly limited, and gas phase polymerization in gaseous monomer, slurry polymerization using a solvent, etc. can be employed. Ethylene per se can be used as a solvent (bulk polymerization). The polymerization method can be either batch-wise polymerization or continuous polymerization, and besides can be carried out in two or more stages differing in reaction condition. The polymerization time is generally optionally determined depending on the kind of desired olefin polymers and reactors, and usually a range of 1 minute to 20 hours can be employed. The catalyst component and monomer can be added to reactor by optional known methods and in optional order. For example, there may be employed a method of simultaneously adding each catalyst component and monomer, a method of consecutively adding them, etc. The catalyst components may be previously contacted in an inert atmosphere before they are contacted with monomer.

The slurry polymerization can be carried out in accordance with known slurry polymerization method and polymerization conditions. A preferred polymerization method in slurry method is to carry out the polymerization continuously using a continuous reactor to which monomer, diluent or the like is continuously added as required and from which a polymer product is continuously or at least periodically taken out. As the reactors, there may be used a loop reactor, an agitation reactor, etc. can be used. Moreover, there may be used a plurality of reactors differing in reaction conditions which are arranged in series and/or parallel.

The solvents used for slurry polymerization include, for example, saturated hydrocarbon solvents such as butane, pentane, hexane, heptane and octane, aromatic hydrocarbon solvents such as benzene and toluene, and halogenated hydrocarbon solvents such as methylene chloride.

As the diluents, there may be used, for example, inert diluents such as paraffin, cycloparaffin and aromatic hydrocarbons. The temperature of reaction zone of polymerization reactors is usually from 0 to 150° C., preferably from 30 to 100° C. The pressure can be changed to usually 0.1-10 MPa, and is preferably 0.5-5 MPa. Inert diluents, solvents, temperature and pressure can be selected so that the ethylene polymer can be produced as solid particles and recovered in this form.

As the conditions for slurry polymerization, the temperature is usually from −30° C. to +150° C., preferably from 0 to 100° C., more preferably from 0 to 80° C. The polymerization activity can be enhanced by carrying out the polymerization at higher temperatures. Furthermore, the molecular weight of the resulting ethylene polymer can be increased by carrying out the polymerization at lower temperatures.

The gas phase polymerization can be carried out in accordance with known gas phase polymerization method and polymerization conditions. As the gas phase polymerization reactor, there is used a fluidized bed type reaction tank, preferably a fluidized bed type reaction tank having enlarged part. A reactor provided with an agitating element in the reaction tank may be used.

As the conditions for gas phase polymerization, the temperature is lower than the temperature at which the polymer is molten, preferably from 0 to 150° C., particularly preferably from 30 to 100° C. Inert gas may be allowed to coexist in the mixed gas in polymerization. The polymerization activity can be enhanced by carrying out the polymerization at higher temperatures. Furthermore, the molecular weight of the resulting ethylene polymer can be increased by carrying out the polymerization at lower temperatures.

The partial pressure of ethylene in polymerization is usually 0.01-10 MPa. For enhancing polymerization activity, the partial pressure is preferably 0.02 MPa or higher, more preferably 0.05 MPa or higher. For increasing the number of ethyl branches of the resulting ethylene polymer, it is preferably 5 MPa or lower, more preferably 2 MPa or lower, further preferably 1 MPa or lower.

In the present invention, a preliminary polymerization may be carried out before the above-mentioned polymerization (final polymerization).

An ethylene polymer of high molecular weight can be obtained by carrying out ethylene polymerization using the catalyst component for polymerization of ethylene which is obtained by contacting the components (A), (B), (C) and (D) of the present invention, and furthermore, the molecular weight of the resulting ethylene polymer can be controlled by known means such as adjustment of temperature of reaction zone and introduction of hydrogen.

An ethylene homopolymer of high molecular weight having substantially only ethyl branch can be obtained by carrying out ethylene homopolymerization using the above catalyst component for polymerization of ethylene. Specifically, an ethylene homopolymer having 7 or more ethyl branches and 0.1 or less alkyl branch other than ethyl branch per 1000 carbon atoms, and having an intrinsic viscosity $[\eta]$ of 0.9 or higher can be obtained. The ethylene homopolymer having 7 or more ethyl branches and 0.1 or less alkyl branch other than ethyl branch per 1000 carbon atoms means that when the ethylene homopolymer has methyl branch and butyl branch as other alkyl branches other than ethyl branch, the number of the methyl branch is 0.1 or less, that of butyl branch is 0.1 or less, and that of ethyl branch is 7 or more per 1000 carbon atoms constituting the main chain of the ethylene homopolymer.

The number of ethyl branch is 7 or more per 1000 carbon atoms, and for increasing mechanical strength of the ethylene homopolymer, it is preferably 8 or more, more preferably 9 or more.

The intrinsic viscosity $[\eta]$ is 0.9 or higher, and for increasing mechanical strength of the ethylene polymer, it is preferably 1.0 or higher, more preferably 1.2 or higher, further preferably 1.5 or higher.

The number of each alkyl branch per 1000 carbon atoms of the ethylene polymer can be obtained by measuring carbon nuclear magnetic resonance spectrum ($^{13}$C-NMR) by carbon nuclear magnetic resonance method under the following conditions and carrying out calculation by the following calculation method.

<Measuring Conditions>

Apparatus: AVANCE 600 manufactured by Bruker Co., Ltd.

Measuring probe: 10 mm probe

Measuring solvent: Mixed solution of 1,2-dichlorobenzene/1,2-dichlorobenzene-d4=75/25 (volume ratio)

Measuring temperature: 130° C.

Measuring method: Proton decoupling method

Pulse width: 45°

Pulse repeating time: 4 seconds

Measuring standard: Tetramethylsilane

Window function: Positive exponential function

The number of integration: Integration is conducted until SN ratio of peaks observed at 32.0-32.2 ppm reaches 100 or more. As for the standard of noise, the area of 50-60 ppm is defined to be noise.

<Method for Calculation of the Number of Ethyl Branch>

When the sum total of integral values of all peaks observed at 5-50 ppm is assumed to be 1000, the sum of integral values of peaks observed at 39.5-40.0 ppm and integral values of peaks observed at 37.1-37.6 ppm is taken as the number of ethyl branch.

<Method for Calculation of the Number of Other Alkyl Branch>

When the sum total of integral values of all peaks observed at 5-50 ppm is assumed to be 1000, the integral value of peaks observed at 19-20 ppm is taken as the number of methyl branch, the integral value of peaks observed at 14.3-14.8 ppm is taken as the number of propyl branch, and the sum of integral values of peaks observed at 38.0-38.5 ppm is taken as the number of branch of 4 or more carbon atoms.

The intrinsic viscosity $[\eta]$ of ethylene polymer can be obtained by the following method.

A tetralin solution in which 2,6-di-t-butyl-p-cresol (BHT) is dissolved at a concentration of 0.5 g/L (hereinafter referred to as blank solution) and a solution prepared by dissolving ethylene polymer in the blank solution at a concentration of 1 mg/ml (hereinafter referred to as sample solution) are prepared. The falling time of the blank solution and the sample solution at 135° C. are measured by Ubbellohde viscometer, and relative viscosity $[\eta rel]$ at 135° C. is obtained from the falling time. Then, the intrinsic viscosity [η] is calculated from the following formula.

[η]=23.3×log(ηrel)

It is considered that according to the present invention, an ethylene polymer having many ethyl branches can be obtained by using an electron donating compound as the component (D).

If necessary, the ethylene polymer obtained by the present invention may contain known additives such as, for example, foaming agent, foaming assistant, crosslinking agent, crosslinking assistant, antioxidant, weathering agent, lubricant, antiblocking agent, antistatic agent, anti-fogging agent, anti-dripping agent, pigment, and filler.

The ethylene polymer obtained by the present invention can be molded by known molding methods, for example, extrusion molding methods such as inflation film molding method and T-die film molding method, injection molding method, compression molding method, extrusion foaming method, atmospheric foaming method, and pressure foaming agent.

Moldings can be obtained using the ethylene polymer obtained by the process of the present invention. The moldings include, for example, pipes, tubes, containers, caps, films and sheets.

EXAMPLES

The present invention will be explained using the following examples and comparative examples.

(1) Intrinsic Viscosity ([η], Unit: dl/g)

A tetralin solution in which 2,6-di-t-butyl-p-cresol (BHT) was dissolved at a concentration of 0.5 g/L (hereinafter referred to as blank solution) and a solution prepared by dissolving ethylene polymer in the blank solution at a concentration of 1 mg/ml (hereinafter referred to as sample solution) were prepared. The falling time of the blank solution and the sample solution at 135° C. were measured by Ubbellohde viscometer, and relative viscosity [ηrel] at 135° C. was obtained from the falling time. Then, the intrinsic viscosity [η] was calculated from the following formula.

[η]=23.3×log(ηrel)

(2) The Number of Ethyl Branch (Carbon Atom Number 2) (Unit: 1/1000 C)

The number of ethyl branch was obtained by measuring carbon nuclear magnetic resonance spectrum ($^{13}$C-NMR) by the carbon nuclear magnetic resonance method under the following conditions and carrying out calculation by the following calculation method.
<Measuring Conditions>
Apparatus: AVANCE 600 manufactured by Bruker Co., Ltd.
Measuring probe: 10 mm probe
Measuring solvent: Mixed solution of 1,2-dichlorobenzene/1,2-dichlorobenzene-d4=75/25 (volume ratio)
Measuring temperature: 130° C.
Measuring method: Proton decoupling method
Pulse width: 45°
Pulse repeating time: 4 seconds
Measuring standard: Tetramethylsilane
Window function: Positive exponential function
The number of integration: Integration was conducted until SN ratio of peaks observed at 32.0-32.2 ppm reached 100 or more. As for the standard of noise, the area of 50-60 ppm was defined to be noise.
<Method for Calculation of the Number of Ethyl Branches>
When the sum total of integral values of all peaks observed at 5-50 ppm was assumed to be 1000, the sum of integral values of peaks observed at 39.5-40.0 ppm and integral values of peaks observed at 37.1-37.6 ppm was taken as the number of ethyl branch.
<Method for Calculation of the Number of Other Alkyl Branches>
When the sum total of integral values of all peaks observed at 5-50 ppm was assumed to be 1000, the integral value of peaks observed at 19-20 ppm was taken as the number of methyl branches, the integral value of peaks observed at 14.3-14.8 ppm was taken as the number of propyl branches, and the sum total of integral values of peaks observed at 38.0-38.5 ppm was taken as the number of branches of 4 or more carbon atoms.

(3) Value of Terminal Vinylidene Group/Terminal Methyl Group

The value was obtained by measuring carbon nuclear magnetic resonance spectrum ($^{13}$C-NMR) by carbon nuclear magnetic resonance method under the following conditions and carrying out calculation by the following calculation method.
<Measuring Conditions>
Apparatus: AVANCE 600 manufactured by Bruker Co., Ltd.
Measuring probe: 10 mm probe
Measuring solvent: A mixed solution of 1,2-dichlorobenzene/1,2-dichlorobenzene-d4=75/25 (volume ratio)
Measuring temperature: 130° C.
Measuring method: Proton decoupling method
Pulse width: 45°
Pulse repeating time: 4 seconds
Measuring standard: Tetramethylsilane
Window function: Positive exponential function
The number of integration: Integration was conducted until SN ratio of peaks observed at 32.0-32.2 ppm reached 100 or more. As for the standard of noise, the area of 50-60 ppm is defined to be noise.
<Method of Calculation>
The integral value of peaks observed at 36.4-36.6 ppm was taken as terminal vinylidene group, and the integral value of peaks observed at 32.0-32.2 ppm was taken as terminal methyl group, and the value of terminal vinylidene group/terminal methyl group was obtained.

(4) Value of Terminal Vinyl Group/Unsaturated Terminal Group, and Value of Terminal Vinylene Group/Unsaturated Terminal Group The value was obtained by measuring proton nuclear magnetic resonance spectrum ($^1$H-NMR) by proton nuclear magnetic resonance method under the following conditions and carrying out calculation by the following calculation method.
<Measuring Conditions>
Apparatus: EX270 manufactured by Nippon Denshi Co., Ltd.
Measuring probe: 5 mm probe
Measuring solvent: 1,2-dichlorobenzene-d4
Concentration of measuring sample: 0.5 ml of measuring solvent based on 10 mg of polymer
Measuring temperature: 130° C.
Pulse width: 30°
Pulse repeating time: 7 seconds
Measuring standard: Tetramethylsilane
The number of integration: 64 times
<Method of Calculation>
The integral value of peaks observed at 4.86-5.02 ppm was taken as terminal vinyl group, and the sum of integral values of peaks observed at 4.64-4.80 ppm (vinylidene), 4.86-5.02 ppm (vinyl) and 5.30-5.53 ppm (trans-vinylene) was taken as terminal unsaturated group, and the value of terminal vinyl group/terminal unsaturated group was obtained.

Furthermore, the integral value of peaks observed at 5.30-5.53 ppm was taken as terminal vinylene group, and the sum of integral values of peaks observed at 4.64-4.80 ppm (vinylidene), 4.86-5.02 ppm (vinyl) and 5.30-5.53 ppm (trans-vinylene) was taken as terminal unsaturated group, and the value of terminal vinylene group/terminal unsaturated group was obtained.

(5) The Proportion of meso-dimethylsilylenebis(1-indenyl)zirconium dichloride in Metallocene Compounds In the light of Non-Patent Document 2, the proportion was obtained by measuring proton nuclear magnetic resonance spectrum ($^1$H-NMR) by proton nuclear magnetic resonance method under the following conditions.

<Measuring Conditions>

Apparatus: EX270 manufactured by Nippon Denshi Co., Ltd.

Measuring probe: 5 mm probe

Measuring solvent: chloroform-dl

Concentration of measuring sample: 0.5 ml of measuring solvent based on 10 mg of sample Measuring temperature: 25° C.

Pulse width: 30°

Pulse repeating time: 5 seconds

Measuring standard: As for the standard of chemical shift value, the peak of chloroform was assumed to be at 7.24 ppm.

The number of integration: 8 times

Example 1

(1) Preparation of Solid Co-Catalyst Component

The inner space of an SUS-made reactor of 180 liters in internal volume having an agitator and a jacket was replaced with nitrogen, and 9.7 kg of silica (Sylopol 948 manufactured by Devison Co., Ltd.; 50% volume average particle diameter=58 μm; pore volume=1.65 ml/g; specific surface area=298 m$^2$/g) subjected to heat treatment at 300° C. under flowing of nitrogen and 100 liters of toluene were introduced in the reactor. After cooling to 2° C., 23.3 kg (75.9 mols as Al atom) of a toluene solution of methylaluminoxane (PMAO-s manufactured by Tosoh Finechem Co., Ltd.) was dropped to the mixture over 62 minutes. After completion of dropping, agitation was carried out at 5° C. for 30 minutes, temperature was raised to 95° C. over 2 hours, and agitation was carried out at 95° C. for 4 hours. Thereafter, temperature was lowered to 40° C., and the content was transferred to an SUS-made reactor of 180 liters in internal volume having an agitator and a jacket which was subjected to nitrogen replacement. Component originating from silica was settled over 50 minutes, and liquid layer component was removed. Thereafter, 100 liters of toluene was added and agitation was carried out for 10 minutes as a washing operation, followed by settling the component originating from silica over about 45 minutes, and the upper layer component of the slurry was removed. The above washing operation was repeated thrice. Then, the slurry was transferred with 120 liters of toluene to an SUS-made filtering apparatus (having filter, agitator and jacket) of 430 liters in internal volume subjected to replacement with nitrogen. Filtration was carried out for 10 minutes, and agitation was again carried out for 10 minutes with addition of 100 liters of toluene, followed by filtration. Furthermore, as washing operation, 100 liters of hexane was added and agitation was carried out for 10 minutes, followed by filtration. This washing operation was repeated twice. The component originating from silica was transferred with 70 liters of hexane to an SUS-made dryer (having agitator and jacket) of 210 liters in internal volume subjected to replacement with nitrogen.

Then, drying with flowing of nitrogen was carried out at a jacket temperature of 80° C. for 7.5 hours to obtain 12.6 kg of a solid component (hereinafter referred to as solid co-catalyst component (S)).

(2) Polymerization

The inner space of an autoclave of 5 liters with an agitator subjected to replacement with argon after vacuum drying was made vacuous, and 1200 g of butane was charged therein, followed by raising the temperature in the system to 50° C. and then introducing ethylene at a partial pressure of 0.1 MPa to stabilize the system. Therein was introduced 1.5 mL of a hexane solution of triisobutylaluminum having a triisobutylaluminum concentration of 1 mmol/mL. Then, therein was introduced 1 mL of a toluene solution of triethylamine having a triethylamine concentration of 0.1 mmol/mL. Then, therein was introduced 3 mL of a toluene solution of meso-dimethylsilylenebis(1-indenyl)zirconium dichloride having a meso-dimethylsilylenebis(1-indenyl)zirconium dichloride concentration of 2 μmol/mL, followed by introducing 43.9 mg of the co-catalyst component (S) obtained in the above Example 1(1). Polymerization was carried out at 50° C. for 240 minutes while continuously feeding ethylene gas so as to maintain the total pressure at constant during polymerization. Thereafter, butane and ethylene were purged to obtain 5.4 g of an ethylene polymer. The resulting ethylene homopolymer had a [η] of 1.88, contained only ethyl branch as alkyl branch, and had a number of ethyl branch of 10.0 (/1000 C).

When $^1$H-NMR was measured on meso-dimethylsilylenebis(1-indenyl)zirconium dichloride used for polymerization was measured, compounds other than meso-dimethylsilylenebis(1-indenyl)zirconium dichloride could not be confirmed.

Example 2

(1) Polymerization

The inner space of an autoclave of 5 liters with an agitator subjected to replacement with argon after vacuum drying was made vacuous, and 1200 g of butane was charged therein, followed by raising the temperature in the system to 50° C. and then introducing ethylene at a partial pressure of 0.1 MPa to stabilize the system. Therein was introduced 1.5 mL of a hexane solution of triisobutylaluminum having a triisobutylaluminum concentration of 1 mmol/mL. Then, therein was introduced 1 mL of a toluene solution of trimethylmethoxysilane having a trimethylmethoxysilane concentration of 0.1 mmol/mL. Then, therein was introduced 3 mL of a toluene solution of meso-dimethylsilylenebis(1-indenyl)zirconium dichloride having a meso-dimethylsilylenebis(1-indenyl)zirconium dichloride concentration of 2 μmol/mL, followed by introducing 47.6 mg of the co-catalyst component (S) obtained in the above Example 1(1). Polymerization was carried out at 50° C. for 180 minutes while continuously feeding ethylene gas so as to maintain the total pressure at constant during polymerization. Thereafter, butane and ethylene were purged to obtain 0.93 g of an ethylene polymer.

The resulting ethylene polymer had a [η] of 2.02, contained only ethyl branch as alkyl branch, and had a number of ethyl branch of 7.9 (/1000 C). When $^1$H -NMR was measured on meso-dimethylsilylenebis(1-indenyl)zirconium dichloride used for polymerization was measured, compounds other than meso-dimethylsilylenebis(1-indenyl)zirconium dichloride could not be confirmed.

Comparative Example 1

(1) Polymerization

The inner space of an autoclave of 5 liters with an agitator subjected to replacement with argon after vacuum drying was made vacuous, and 1200 g of butane was charged therein, followed by raising the temperature in the system to 50° C. and then introducing ethylene so as to attain a partial pressure of 0.1 MPa, thereby to stabilize the system. Therein was introduced 11.0 mL of a hexane solution of methylaluminoxane (PMAO-s manufactured by Tosoh Finechem Co., Ltd.) having a methylaluminoxane concentration of 2.72 mmol/mL (concentration of methylaluminoxane based on the solvent was 30 mmols/mL). Then, therein was introduced 3 mL of a toluene solution of meso-dimethylsilylenebis(1-indenyl)zirconium dichloride having a meso-dimethylsilylenebis(1-indenyl)zirconium dichloride concentration of 2 μmol/mL. Polymerization was carried out at 50° C. for 240 minutes while continuously feeding ethylene gas so as to maintain a constant total pressure during polymerization. Thereafter, butane and ethylene were purged to obtain 33.5 g of an ethylene polymer. The resulting ethylene homopolymer had a [η] of 0.66, contained only ethyl branch as alkyl branch observed in NMR measurement, and had a number of ethyl branch of 14.4 (/1000 C). Furthermore, in NMR measurement, only ethylvinylidene structure was observed as an unsaturated terminal structure. Terminal vinyl group and terminal vinylene group were not observed, and the ratio of terminal vinylidene/terminal methyl was 0.87. When $^1$H-NMR was measured on meso-dimethylsilylenebis(1-indenyl)zirconium dichloride used for polymerization was measured, compounds other than meso-dimethylsilylenebis(1-indenyl)zirconium dichloride could not be confirmed.

The invention claimed is:

1. A catalyst component for ethylene polymerization which is obtained by contacting the following components (A), (B), (C) and (D):
   component (A): a meso-metallocene compound,
   component (B): a compound which ionizes a metallocene compound to form an ionic complex,
   component (C): an organoaluminum compound, and
   component (D): an electron donating compound.

2. A process for producing an ethylene polymer by polymerizing ethylene in the presence of the catalyst component for ethylene polymerization according to claim 1.

* * * * *